(12) United States Patent
Suess et al.

(10) Patent No.: US 7,434,536 B2
(45) Date of Patent: Oct. 14, 2008

(54) DISC INDICATOR

(75) Inventors: Manfred Suess, Remchingen (DE); Martin Mayer, Sinsheim (DE)

(73) Assignee: Borg Instruments AG, Remchingen (DE)

( * ) Notice: Subject to any disclaimer, the term of this patent is extended or adjusted under 35 U.S.C. 154(b) by 0 days.

(21) Appl. No.: 10/564,233

(22) PCT Filed: Jul. 8, 2004

(86) PCT No.: PCT/EP2004/007502

§ 371 (c)(1),
(2), (4) Date: Oct. 5, 2006

(87) PCT Pub. No.: WO2005/005931

PCT Pub. Date: Jan. 20, 2005

(65) Prior Publication Data

US 2007/0040697 A1    Feb. 22, 2007

(30) Foreign Application Priority Data

Jul. 10, 2003    (DE) ................................. 103 31 443

(51) Int. Cl.
*G01D 13/04*    (2006.01)
(52) U.S. Cl. .................. 116/298; 116/62.1; 116/DIG. 6
(58) Field of Classification Search ................ 116/62.1, 116/62.4, 284, 286, 287, 288, 298, 303, 305, 116/DIG. 6, DIG. 36; 368/77, 221, 233
See application file for complete search history.

(56) References Cited

U.S. PATENT DOCUMENTS

| 2,749,704 | A | * | 6/1956 | Heikkila | ..................... 368/233 |
| 4,020,787 | A | | 5/1977 | Castro et al. | |
| 2002/0108554 | A1 | | 8/2002 | Zech et al. | |
| 2006/0012971 | A1 | * | 1/2006 | Fong et al. | ..................... 362/23 |

FOREIGN PATENT DOCUMENTS

| DE | 198 49 161 | A1 | | 5/2000 |
| DE | 199 16 221 | A1 | | 7/2000 |
| DE | 199 03 202 | A1 | | 8/2000 |
| DE | 1005026196 | A1 | * | 12/2006 |
| DE | 1005046714 | A1 | * | 4/2007 |
| DE | 1005055906 | A1 | * | 5/2007 |

(Continued)

OTHER PUBLICATIONS

International Search Report for PCT/EP 2004/007502, date of mailing Jul. 2, 2005, 3 pages.

*Primary Examiner*—R. A. Smith
(74) *Attorney, Agent, or Firm*—Foley & Lardner LLP

(57) ABSTRACT

An analog display instrument is provided, in particular for use in dashboards in motor vehicles, having an indicator disc mounted by a radial bearing such that the radial bearing allows the indicator disc to rotate. The indicator disc is fitted with a pointer which can be pivoted in front of a scale. The radial bearing comprises a sliding element and a guide element, with either of the slide element and the guide element having a ring structure and the other element having a holder which is suitable to hold the ring structure. The radial bearing is a journal bearing with the holder resting directly on a wall of the ring structure such that the ring structure may slide with respect to the holder.

20 Claims, 3 Drawing Sheets

FOREIGN PATENT DOCUMENTS

| | | | |
|---|---|---|---|
| EP | 04 92 543 A1 | | 7/1992 |
| EP | 09 85 912 A1 | | 3/2000 |
| FR | 2896582 A1 | * | 7/2007 |
| JP | 2004361182 A | * | 12/2004 |
| JP | 2004361183 A | * | 12/2004 |
| JP | 2005098948 A | * | 4/2005 |
| JP | 2005106662 A | * | 4/2005 |
| JP | 2005156461 A | * | 6/2005 |
| JP | 2006017490 A | * | 1/2006 |
| JP | 2006090833 A | * | 4/2006 |
| JP | 2006090834 A | * | 4/2006 |
| JP | 2006098148 A | * | 4/2006 |
| JP | 2006208253 A | * | 8/2006 |
| WO | WO 2006003784 A1 | * | 1/2006 |
| WO | WO 2006011335 A1 | * | 2/2006 |

* cited by examiner

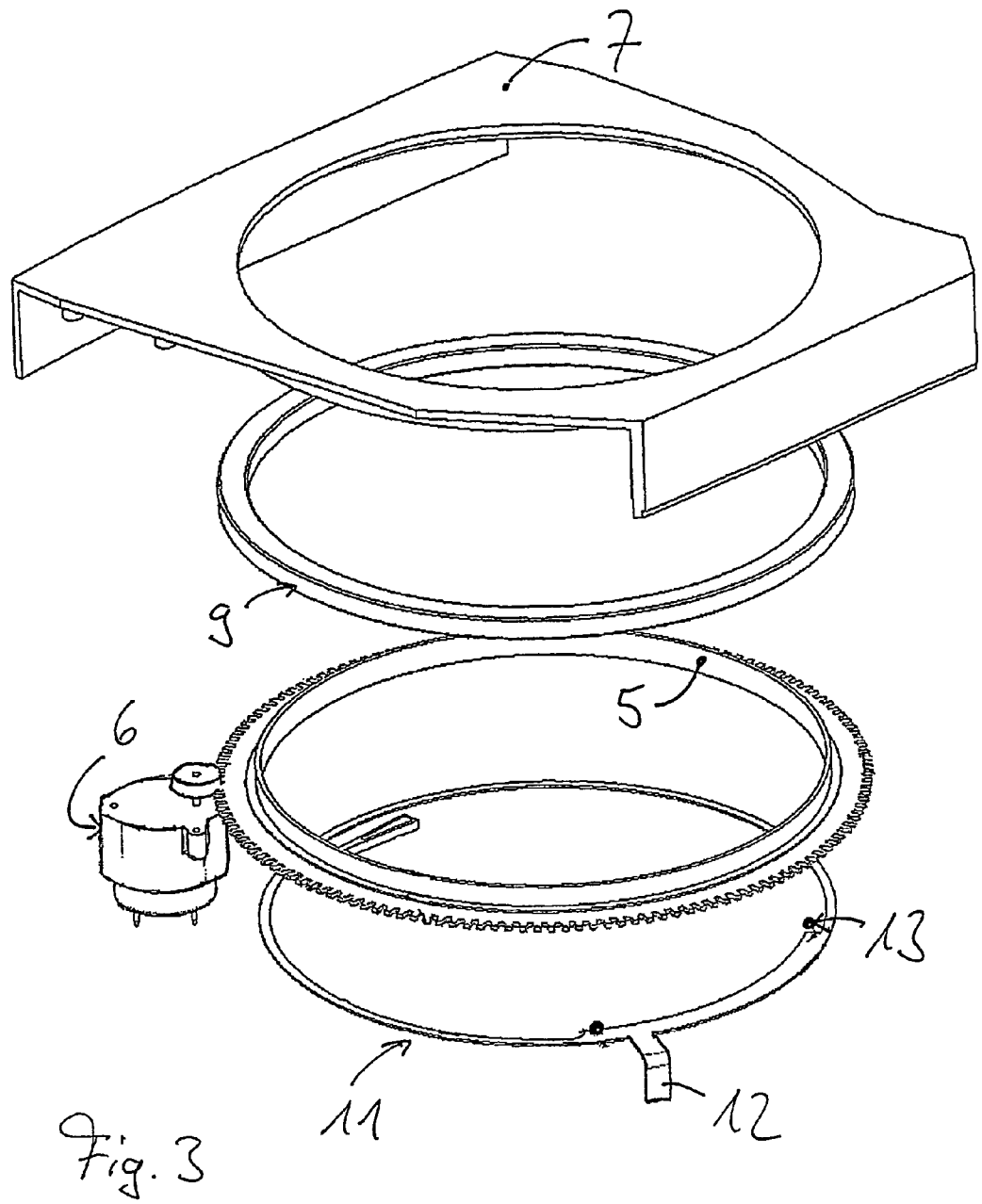

DISC INDICATOR

CROSS-REFERENCE TO RELATED PATENT APPLICATIONS

The present Application is a National Stage of Application PCT/EP2004/007502 entitled, "Disc Indicator" filed on Jul. 8, 2004 which published under PCT Article 21(2) on Jan. 20, 2005 as WO 2005/005931 A2 in the German language, which claims priority to German Patent Application No. DE 103 31 443 A1 filed on Jul. 10, 2003, the disclosures of which are incorporated herein by reference in their entirety.

BACKGROUND

The present invention relates to an analog display instrument, in particular for use in dashboards in motor vehicles.

Disc indicators of this generic type have bearings for instruments on motor vehicles. In this case, the only instruments which are referred to as "disc indicators" in this context are those in which the indicator disc is not held on a shaft that is mounted such that it can rotate, but the indicator disc is mounted such that a guided ring structure allows the indicator disc to rotate. Finally, the special feature of disc indicators such as these is that there is no need for the central shaft. This results in a high degree of flexibility with regard to the design options for the instrument.

One disc indicator of this type is disclosed, for example, in DE 199 16 221 A1, which has a disc to which the pointer is fitted, with the disc being held between two guide rollers at its outer edge. In this case, one of the rollers is driven by a stepping motor.

In DE 199 03 202 A1, covers are fitted with pointer symbols, have a circular external contour and are mounted in the cutouts in a board or panel such that they can rotate. In this case, rolling elements are fitted in the covers in order to minimize the friction in the bearing. The drive which initiates the rotary movement is provided by an electric motor, which acts on a toothed rim on the cover.

EP 492 543 A1 describes a pointer plate which is driven by an annular ultrasound motor in such a way that the pointer plate is connected to the rotor of this ultrasound motor such that they rotate together, by the edge of the pointer plate being formed such that it is oriented orthogonally with respect to the plate plane, thus producing a holder for the rotor part of the ultrasound motor. No radial bearing is formed by this design.

In consequence, the types of bearing specified for disc indicators are complex with a large number of components, resulting in correspondingly expensive manufacturing costs. Furthermore, instruments such as these may be less reliable in operation. Although disc indicators have a number of advantages over conventional instruments which have a pointer held at the end of a shaft, it has not until now been possible to make use of these instruments, particularly because of the high production costs.

SUMMARY

The present instrument cluster provides an analog display instrument with a disc indicator, which has a simple and compact design and which offers high reliability with low-cost manufacture.

According to an embodiment, an instrument of this generic type is provided in which the radial bearing is a journal bearing, with a holding means resting directly on one wall of the ring structure such that it can slide.

According to one exemplary embodiment, an analog display instrument is provided, in particular for use in dashboards in motor vehicles, having an indicator disc mounted such that a radial bearing allows the indicator disc to rotate. The indicator disc is fitted with a pointer which can be pivoted in front of a scale. The radial bearing comprises a sliding element and a guide element, with either of the slide element and the guide element having a ring structure and the other element having a holder which is suitable to hold the ring structure. The radial bearing is a journal bearing with the holder resting directly on a wall of the ring structure such that the ring structure may slide with respect to the holder.

In another exemplary embodiment, a vehicle dashboard having an analog display instrument for use in a motor vehicle comprises an indicator disc and a pointer coupled to the indicator disc. The pointer is configured to rotate with respect to a scale coupled to the display instrument. A journal bearing is coupled to the pointer and further coupled to the vehicle dashboard. The journal bearing is configured to allow the pointer to rotate with respect to the vehicle dashboard.

In yet another exemplary embodiment, a method of rotating a pointer on a display instrument suitable for a motor vehicle, without utilization of a shaft, comprises providing an indicator disc; providing a pointer coupled to the indicator disc and configured to rotate with respect to a scale coupled to the display instrument; coupling the pointer to the vehicle dashboard through a journal bearing configured to allow the pointer to rotate with respect to the vehicle dashboard; and rotating the indicator disc via a stepper motor.

The bearing for the disc indicator is greatly simplified. The simplification is achieved by mounting the indicator disc directly in a compact and robust holder. In this case, the disc indicator makes use of the discovery that the bearing for a pointer such as this is also subject to only relatively minor requirements, because of the relatively low rotation speeds and numbers of revolutions. Finally the instruments under discussion carry out only comparatively slow pivoting movements in the one direction and the other. These can be carried out even by "primitive" journal bearings, in which sliding elements and guide elements are manufactured from materials that are easy to machine, such as plastic. Furthermore, the production of disc indicators mounted in a simple manner such as these is not complex, and thus costs little, because the tolerances are relatively wide in comparison to heavily loaded journal bearings. Particularly in the case of minor loads such as these, there is no need for any increased sliding capability or for any cooling of the bearings in order to avoid wear. A further advantage is that a plurality of the disc indicators can be arranged one inside the other, and it is even possible for one indicator disc to form the bearing for the adjacent indicator disc.

BRIEF DESCRIPTION OF THE DRAWINGS

This invention will be understood more clearly with reference to the following description and the appended drawings, in which:

FIG. 3 illustrates a front view of the instrument illustrated in exploded form according to an exemplary embodiment.

DETAILED DESCRIPTION

Figure 1:
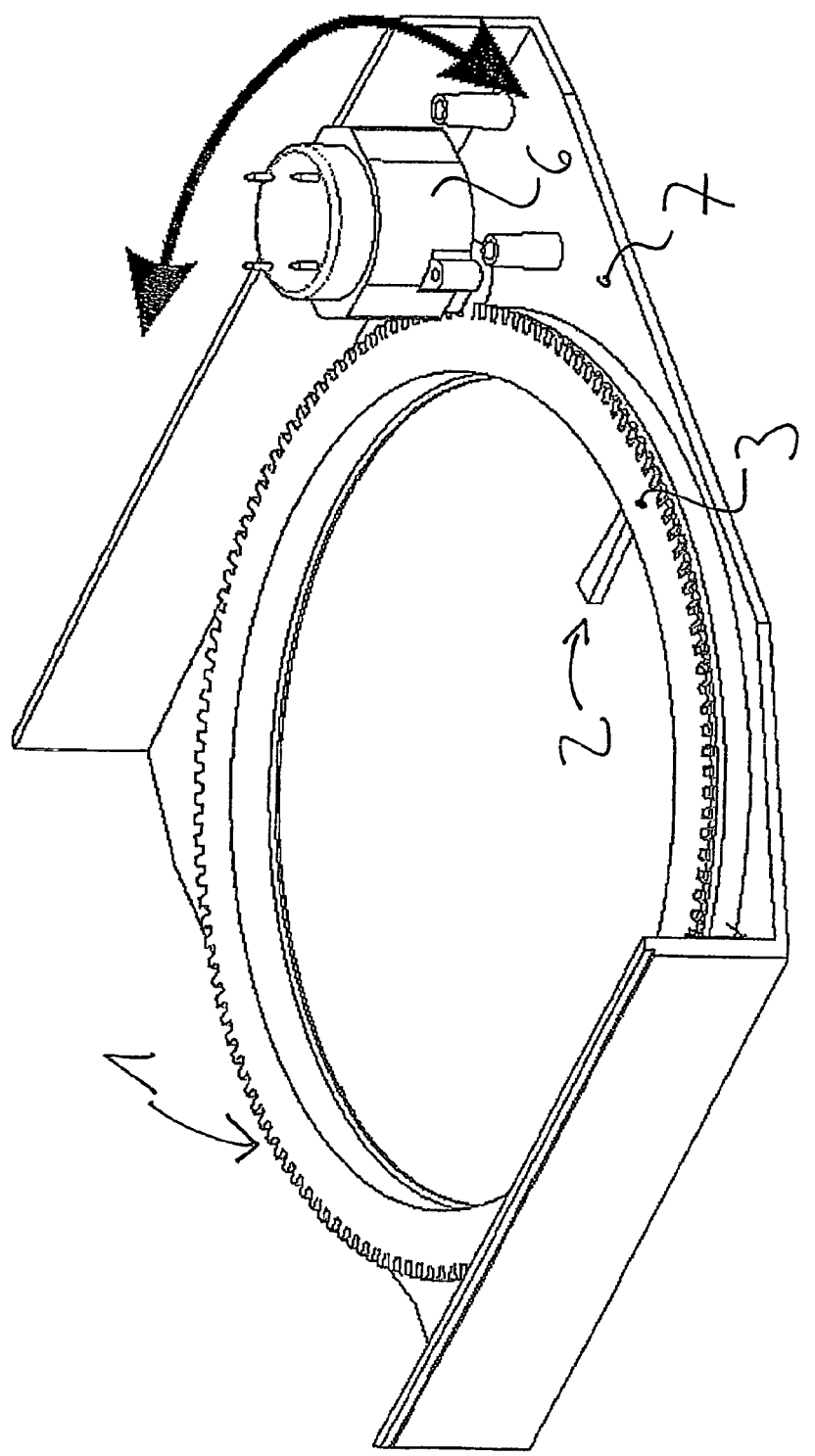
FIG. 1 illustrates an instrument with a disc indicator according to an exemplary embodiment.
Figure 2:
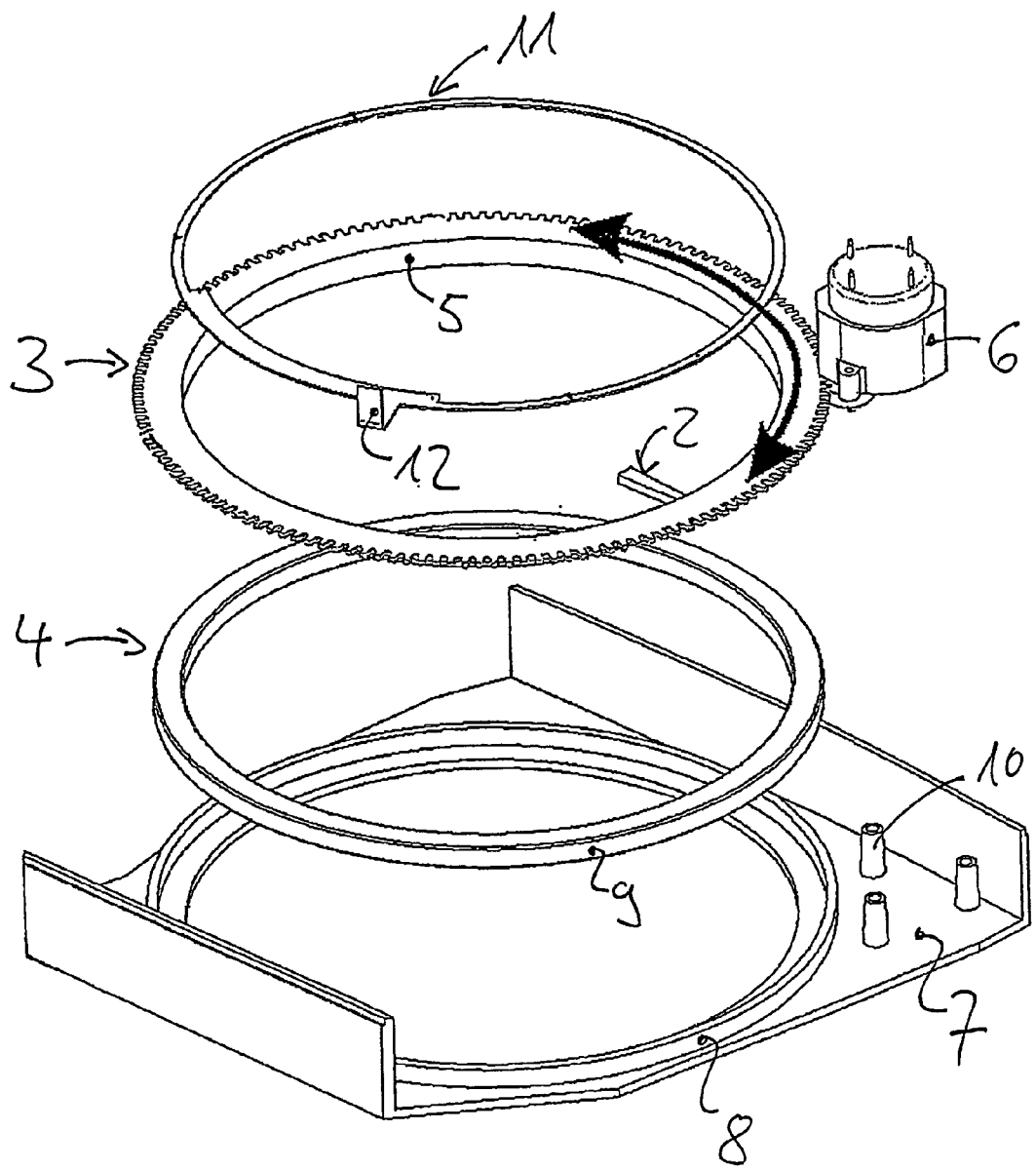
FIG. 2 illustrates a view from the rear of the instrument illustrated in an exploded form according to an exemplary embodiment.

In the FIGURES, identical parts are provided with the same reference numbers and they are generally also only described once in each exemplary embodiment.

The indicator disc 1 is mounted by a radial bearing such that the radial bearing allows the indicator disc 1 to rotate. In this case, the radial bearing is a journal bearing of simple design, in which the indicator disc 1 forms the sliding element. The guide element is part of a front panel 7 of a combination instrument which, with a circular opening, forms a frame. A cylindrical holder 8 is integrally formed on the rear face of the front panel 7, as the bearing element. The holder 8 holds an appropriately cylindrically shaped ring structure of the indicator disc 1. In this case, the ring structure is a cylindrical attachment 9 which is integrally formed on the disc surface of the bearing ring 4. In the assembled state, the cylindrical attachment 9 engages in the cylindrical holder 8, with the walls of the two parts resting directly on one another such that they slide. In this case, the cylindrically formed holder 8 surrounds the cylindrical attachment 9, so that the outer wall of the sliding element slides on the inner wall of the bearing element.

The indicator disc 1 is mounted by a radial bearing such that it can rotate. In this case, the radial bearing is a journal bearing of simple design, in which the indicator disc 1 forms the sliding element. The guide element is part of a front panel 7 of a combination instrument which, with a circular opening, forms a frame. A cylindrical holder 8 is integrally formed on the rear face of the front panel 7, as the bearing element. The holder 8 holds an appropriately cylindrically shaped ring structure of the indicator disc 1. In this case, the ring structure is a cylindrical attachment 9 which is integrally formed on the disc surface of the bearing ring 4. In the assembled state, the cylindrical attachment 9 engages in the cylindrical holder 8, with the walls of the two parts resting directly on one another such that they slide. In this case, the cylindrically formed holder 8 surrounds the cylindrical attachment 9, so that the outer wall of the sliding element slides on the inner wall of the bearing element.

The stepping motor 6 is inserted in a holder, which is formed by the pin 10, on the rear face of the front panel 7. The pointer 2 is illuminated, with a flexible printed circuit 11 being adhesively bonded to the indicator disc 1 and with a contact element 12. The light-emitting diodes 13 which illuminate the pointer 2 (FIG. 3) are driven by means of the flexible printed circuit 11.

In situations in which there is direct contact between a sliding element and a guide element, the radial bearing is thus in the form of a journal bearing, with one or more holding means resting directly on one wall of the ring structure such that it or they can slide. At this point, it should also be noted that it is not just possible to use circular discs as an indictor disc, but that other geometries, for example polygonal discs or discs in the form of a sector of a circle or a segment of a circle are also suitable for use as indicator discs.

In fact, as a result of the possibility to cinematically reverse the relationship between the sliding element and the guide element in each case, a large number of embodiments are possible for implementation. The illustrated exemplary embodiments have the following advantages: particularly compact and robust instruments with a disc indicator can be manufactured using the, and are distinguished by high reliability and low production costs. In particular, the instruments provide a large number of configuration options with regard to individual design and a clear and informative layout of the displays, particularly in conjunction with a combination instrument.

These stated advantages are particularly important when the indicator disc has the sliding element, and this is fitted with the ring structure. In this context, the expression "ring structure" should be understood in an entirely general form. For example, the expression a ring structure may cover slots curved in an annular shape, raised individual elements in an annular arrangement or a cylindrically formed step. Furthermore, the ring need not cover the complete circumference of a circle, but only a part of a circle.

In one exemplary embodiment, the indicator disc provided with the ring structure can rotate with respect to the fixed guide element. In order to allow this rotation to be carried out, it is advantageous for the indicator disc to be provided with a toothed rim, in which case the toothed rim may either be integrally formed directly on the indictor disc or may be connected to the indicator disc as a separate component, such that they rotate together. The pinion of a stepping motor can engage directly or via a transmission with the toothed rim. In another exemplary embodiment, a piezo drive is used instead of a stepping motor, in which case a stepping motor may have certain advantages with respect to its defined drive.

With regard to a more simplistic design and a clear form of the display panel, in one exemplary embodiment the indicator disc is in the form of an annular disc which is open in the centre and, in particular, is narrow. In this case, the width of the edge may be comparatively small in comparison to the diameter of the opening. This makes it possible to ensure that analog instruments such as these also require only a small amount of space on a display panel. From this point of view, it is also advantageous for the ring structure to be fitted as a cylindrical attachment to the disc surface in a simple manner and, in particular to be integrally formed therein, in which case the attachment then forms the sliding element. The cylindrical shape does not need to be complete. Even a partially complete geometry is sufficient, provided that guidance is ensured without hooking-up and tilting.

In one exemplary embodiment, one of the two walls of the cylindrical attachment advantageously rests directly on the wall, such that it can slide, of an appropriately cylindrically shaped bearing element. The match between the two elements should be provided in such a way that sliding is possible without any problems, depending on the material. In this exemplary embodiment, because of the particularly simple handling during production, it is advantageous for the cylindrically shaped bearing element to surround the correspondingly internally arranged sliding element, so that the outer wall of the sliding element slides along the inner wall of the bearing element. The moving sliding element accordingly slides within the fixed-position bearing, thus ensuring that the disc indicator is well protected against external adverse effects.

One low-cost alternative exemplary embodiment which can be implemented particularly easily provides for the sliding element and/or the guide element to be manufactured from plastic which can slide. In particular polyoxymethylene (POM) may be applied by spraying. Plastics which can slide are commercially available, and their processing does not differ from that of conventional plastics. The use of these materials makes it possible to dispense with the special handling or coating of the surfaces which would otherwise be indicated. Furthermore, there is no need to use lubricants.

It should be understood that the construction and arrangement of the elements of the disc indicator in the exemplary embodiments are illustrative only. Although several embodiments of the disc indicator have been described in detail in this disclosure, many modifications are possible without materially departing from the novel teachings and advantages of the subject matter recited in the claims. Accordingly, all such modifications are intended to be included within the scope of the present disc indicator as defined in the appended claims. Unless specifically otherwise noted, the claims reciting a single particular element also encompass a plurality of such particular elements. Moreover, claims reciting that one element is coupled to another should be interpreted to mean that the elements are selectively coupled to each other and may be uncoupled or disconnected at any point. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

The invention claimed is:

1. An analog display instrument, in particular for use in dashboards in motor vehicles, having an indicator disc mounted by a radial bearing such that the radial bearing allows the indicator disc to rotate, wherein the indicator disc is fitted with a pointer which can be pivoted in front of a scale, wherein the radial bearing comprises a sliding element and a guide element, with any one of the slide element and the guide element having a ring structure and the other element having a holder which is suitable to hold the ring structure and wherein the radial bearing is a journal bearing, with the holder resting directly on a wall of the ring structure such that the ring structure may slide with respect to the holder.

2. The instrument of claim 1, wherein the ring structure is connected to the sliding element and configured to rotate with respect to the guide element, and wherein the guide element is fixed.

3. The instrument of claim 2, further comprising: a stepper motor; wherein the indicator disc comprises a toothed rim connected to the indicator disc such that the indicator disc and the toothed rim rotate together, wherein the indicator disc and the toothed rim are separate components, wherein the stepping motor is configured to rotate the indicator disc by the toothed rim.

4. The instrument of claim 1, wherein the indicator disc comprises an annular disc, and wherein the ring structure comprises a cylindrical attachment coupled to a surface of the annular disc.

5. The instrument of claim 4, wherein the holder comprises a cylindrically shaped bearing element and wherein the wall of the cylindrical attachment of the ring structure rests in a sliding manner with respect to an inner wall of the cylindrically shaped bearing element of the holder.

6. The instrument of claim 5, wherein the cylindrically shaped bearing element of the holder surrounds the cylindrical attachment of the ring structure, such that the wall of the cylindrical attachment slides on the inner wall of the cylindrically shaped bearing element.

7. The instrument of claim 5, further comprising a panel defining a frame, the frame having a rear face, wherein the cylindrically shaped bearing element of the holder is coupled to the rear face of the frame.

8. The instrument of claim 1, wherein any one of the sliding element and the guide element are composed of polyoxymethylene.

9. The instrument of claim 1, wherein the pointer can be illuminated and is configured to be aligned in the radial direction, and wherein the pointer is coupled to the indicator disc.

10. The instrument of claim 9, wherein the pointer is integrally formed on any one of the indicator disc and a toothed rim as an attachment configured to point inwards.

11. The instrument of claim 9, further comprising a light-emitting diode configured to illuminate the pointer; wherein the indicator disc comprises a printed circuit adhesively bonded to the toothed rim, wherein the indicator disc comprises a contact element, and wherein the light-emitting diode is driven via the printed circuit through the contact element.

12. A vehicle dashboard having an analog display instrument for use in a motor vehicle, comprising: an indicator disc; a pointer coupled to the indicator disc and configured to rotate with respect to a scale coupled to the display instrument; and a journal bearing coupled to the pointer and further coupled to the vehicle dashboard, wherein the journal bearing is configured to allow the pointer to rotate with respect to the vehicle dashboard.

13. The dashboard of claim 12, wherein the journal bearing comprises a guide element and a sliding element, the guide element having a holder and the sliding element having a ring structure, and wherein the holder is configured to abut the ring structure such that the ring structure may slide with respect to the holder.

14. The dashboard of claim 12, further comprising: a toothed rim coupled to the disc indicator; and a stepper motor configured to rotate the indicator disc by the toothed rim.

15. The dashboard of claim 12, wherein the holder surrounds the ring structure in the journal bearing.

16. The dashboard of claim 15, wherein the indicator disc comprises an annular disc, and wherein the ring structure comprises a cylindrical attachment coupled to the surface of the annular disc.

17. The instrument of claim 16, wherein the holder comprises a cylindrically shaped bearing element and wherein a wall of the cylindrical attachment of the ring structure rests in a sliding manner with respect to a wall of the cylindrically shaped bearing element of the holder.

18. A method of rotating a pointer on a display instrument suitable for a motor vehicle, without utilization of a shaft, comprising: providing an indicator disc; providing a pointer coupled to the indicator disc and configured to rotate with respect to a scale coupled to the display instrument; coupling the pointer to the vehicle dashboard through a journal bearing configured to allow the pointer to rotate with respect to the vehicle dashboard; and rotating the indicator disc via a stepper motor.

19. The method of claim 18, wherein the disc indicator comprises a toothed rim, wherein the stepper motor is configured to rotate the toothed rim and wherein the rotating of the indicator disc is accomplished by the stepper motor through the toothed rim.

20. The method of claim 19, further comprising: providing a light-emitting diode configured to illuminate the pointer; and providing a printed circuit coupled to the toothed rim, wherein the indicator disc comprises a contact element, and wherein the light-emitting diode is driven via the printed circuit through the contact element.

* * * * *